United States Patent [19]
Tsuda

[11] Patent Number: 5,345,594
[45] Date of Patent: Sep. 6, 1994

[54] INFORMATION TRANSMISSION SYSTEM RETRANSMITTING INFORMATION SIGNALS ACCORDING TO RETRANSMISSION SCHEDULE

[75] Inventor: Youichirou Tsuda, Tokyo, Japan

[73] Assignee: Pioneer Electronic Corporation, Tokyo, Japan

[21] Appl. No.: 801,924

[22] Filed: Dec. 3, 1991

[30] Foreign Application Priority Data

Jan. 31, 1991 [JP] Japan .................................. 3-011084

[51] Int. Cl.5 ............................................. H04B 7/14
[52] U.S. Cl. ..................... 455/18; 455/13.1; 455/72; 455/53.1; 348/6
[58] Field of Search ............... 455/3.1, 4.1, 6.3, 121, 455/13.1, 73.2, 18, 53.1, 51.1, 51.2, 70, 72; 358/86

[56] References Cited

U.S. PATENT DOCUMENTS 5,099,319 3/1992 Esch et al. ......................... 358/86

*Primary Examiner*—Reinhard J. Eisenzopf
*Assistant Examiner*—Chi Pham
*Attorney, Agent, or Firm*—Sughrue, Mion, Zinn, Macpeak & Seas

[57] ABSTRACT

An information transmission system in which an information signal supplied from a base station is automatically edited at relay stations and retransmitted to terminal stations according to a retransmission schedule assigned to each relay station. The transmission schedule is transmitted together with the information signal from the base station to the relay station which in turn records portions of the information signal directed to the station itself onto a rewritable recording medium (e.g. an optical disk) and retransmits it to its terminal stations according to the retransmission schedule.

20 Claims, 14 Drawing Sheets

CATV SYSTEM UTILIZING SATELLITE

CATV SYSTEM UTILIZING SATELLITE

BASE BAND SIGNAL OF DIGITAL SUBCARRIER AUDIO ADDITION SYSTEM

DATA FORMAT

HEADER FORMAT

11
PACKET FORMAT PROCESSING CIRCUIT

RELAY STATION

FORMAT OF RECORD SIGNAL

VIDEO PICK TIMING

FORMAT OF PICKUP Q

INFORMATION TRANSMISSION SYSTEM RETRANSMITTING INFORMATION SIGNALS ACCORDING TO RETRANSMISSION SCHEDULE

BACKGROUND OF THE INVENTION

1. Field of the Invention

The present invention relates to an information transmission system for use with a communications satellite, for example.

2. Description of Related Art

There is an information transmission system widely known as a CATV system in which an information signals carrying video and audio information are transmitted from a base station and relay stations receiving the information signals from the base station where those information signals is retransmitted to a plurality of terminal stations via coaxial cables or fiber-optic cables. In such a known information transmission system, the retransmission of data from the relay station to the terminal stations is carried out in real time. This results in difficulties in making out a schedule for distributing prearranged information signals to the terminal stations and the information signal from the base station. Thus, a drawback has been encountered, in practice, that retransmission of the information signals cannot be executed following a schedule laid out minutely.

OBJECT AND SUMMARY OF THE INVENTION

It is thus an object of the present invention to provide an improved information transmission system in which information signals from a base station are automatically edited at the relay station, and retransmitted to terminal stations according to a desired retransmission schedule.

An information transmission system according to the present invention comprises a base station for supplying an information signal carrying video and audio information and at least a relay station for receiving and retransmitting the information signal to a plurality of terminal stations. In particular, the base station comprises means for producing the information signal, means for producing retransmission schedule data, means for combining the information signal and the retransmission schedule data to produce a composite signal, and transmitter means for transmitting the composite signal. The relay station comprises receiving means for receiving the composite signal, extracting means for extracting by separating the retransmission schedule data from the composite signal, memory means for storing the retransmission schedule data, recording medium playing means for recording the information signal contained in the composite signal into a rewritable recording medium and retrieving the information signal from the recording medium according to the retransmission schedule data and outputting the reproduced information signal, and retransmitting means for retransmitting the reproduced information signal to the terminal stations.

According to another aspect of the invention, the relay station is provided with retransmitting means for time base expanding the reproduced information signal and retransmitting the reproduced information signal to the terminal stations.

In operation of the information transmission system according to the present invention, retransmission schedule data is transmitted in combination with the information signal from the base station to relay stations where it is extracted by separation and stored while the information signal is recorded onto a rewritable recording medium. Then, the relay station retrieves the information signal from the recording medium according to the retransmission schedule and retransmits them to the terminal stations while effecting a time base expanding process to the retrieved information signal.

DETAILED DESCRIPTION OF THE EMBODIMENTS

Figure 1:
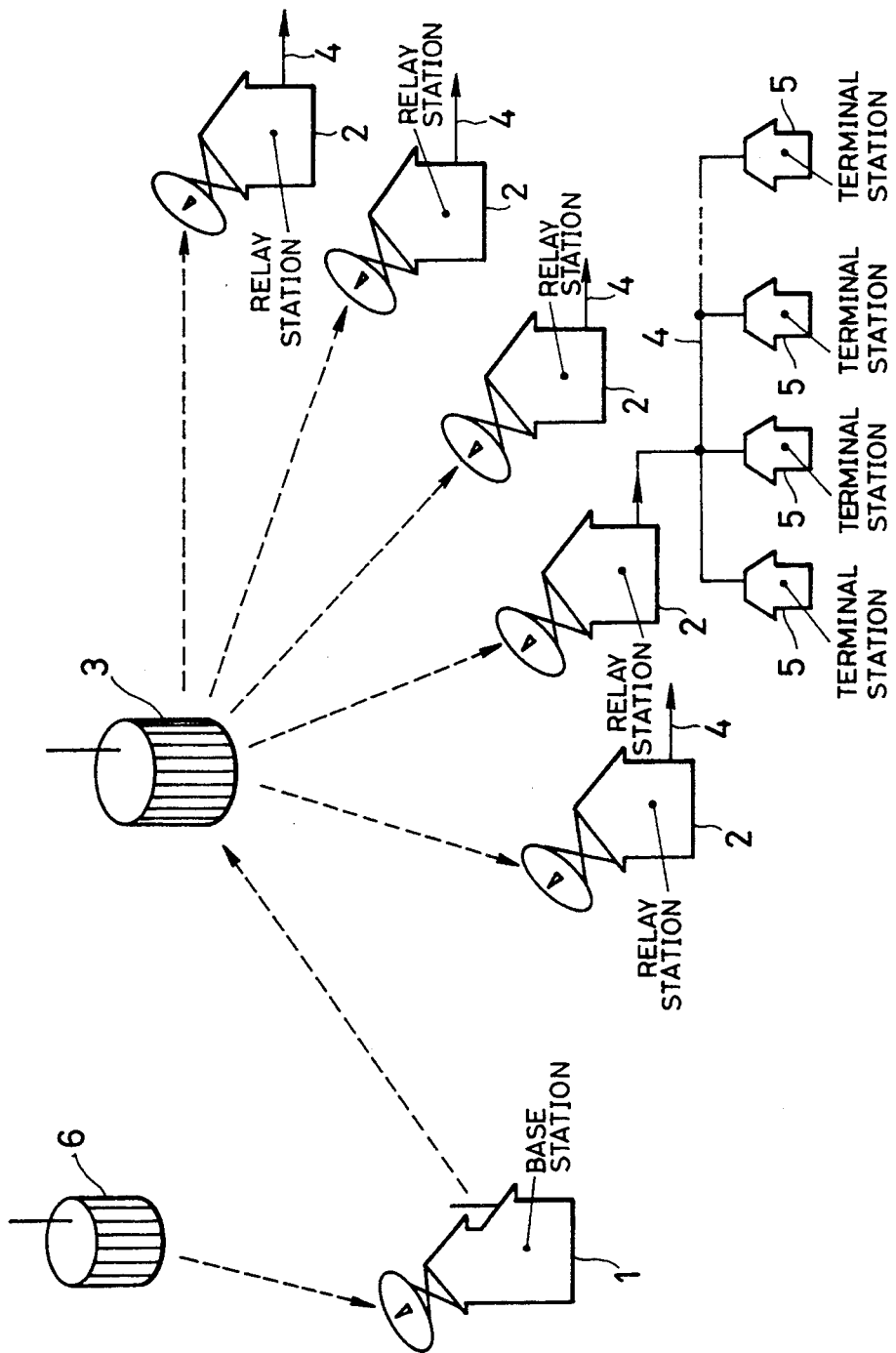
FIG. 1 is a schematic view showing a CATV system utilizing a communications satellite according to the present invention.

Preferred embodiments of the present invention will be described referring to FIGS. 1 to 16. As shown in FIG. 1, a base station 1 sends an information signal carrying video and audio data to each of a plurality of relay stations 2 by means of a communications satellite 3. Each relay station 2 edits the information signal and retransmits it through cable network 4 to a multiplicity of terminal stations 5. Also, the base station 1 receives weather information signals from a meteorological satellite 6, such as, "AMeDAS" or "Himawari", and prepares weather data as display information to be retransmitted the terminal stations 5 from each relay station 2.

Figure 2:
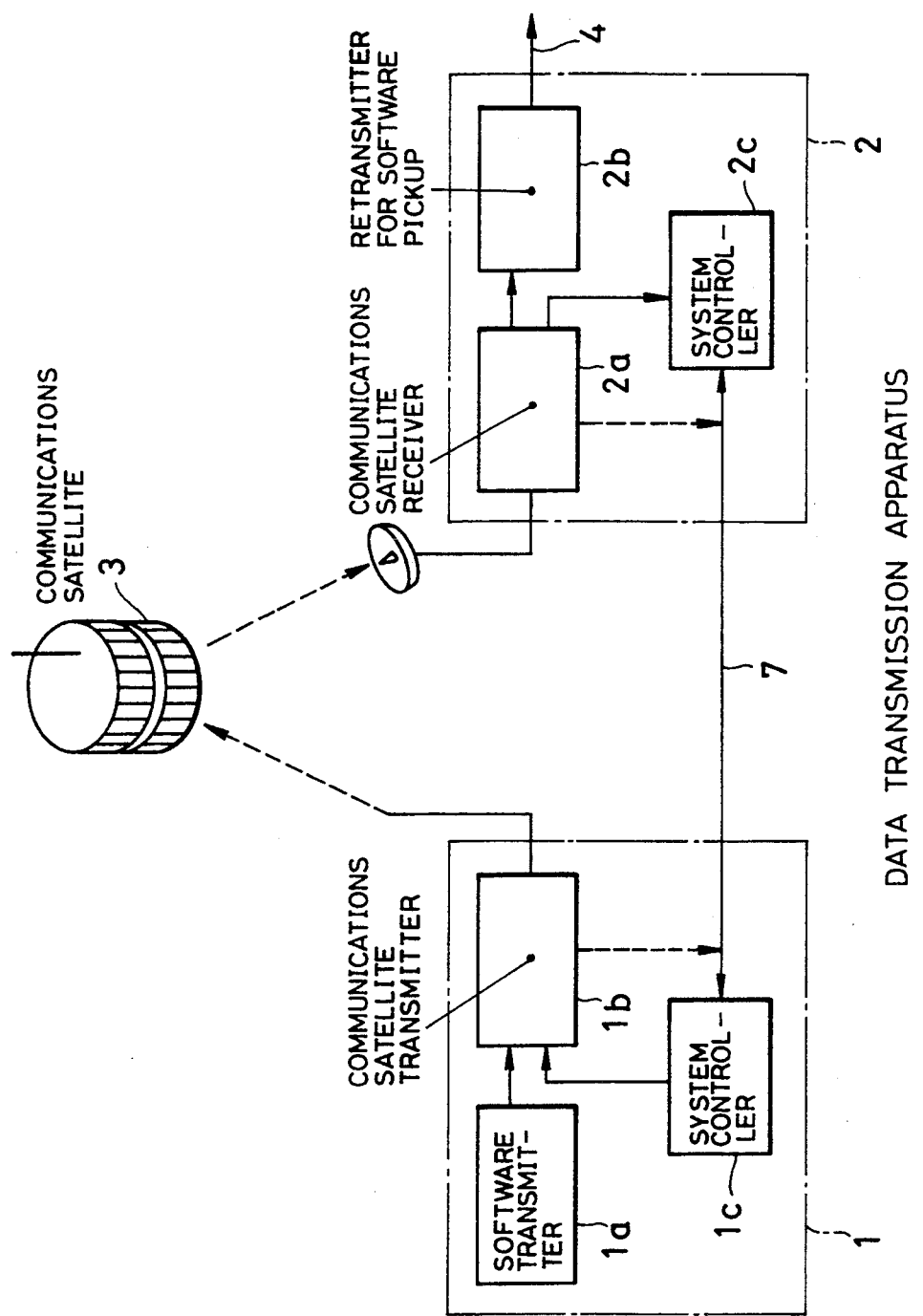
FIG. 2 is a block diagram generally showing the arrangement of an information transmission system of the present invention.

FIG. 2 shows in more detail in which a information signal which contains three lines of information, i.e., a video signal carrying picture information, a PCM audio signal carrying sound data, and information data, is delivered from a software data transmitter 1a of the base station 1. The information data includes data such as retransmission schedule data, video pickup information, bill message, and the above-mentioned weather data. The contents of the information data can be selected to serve various purposes. The information signal is supplied to a satellite communication transmitter 1b serving as transmitting means. On the basis of the received information signal the satellite communication transmitter 1b modulates an uplink carrier wave with the information signal and transmits it to the communications satellite 3. The PCM audio signal is a PCM signal which includes not only sound data for television (TV) motion pictures but also BGM data for playback with still pictures or other independent audio data. A system controller 1c performs a series of control operations in the base station 1.

The radio wave from the base station is then frequency converted at the communications satellite 3 to a downlink carrier wave and transmitted to the ground. The modulation wave transmitted by the communications satellite 3 is demodulated by a satellite communication receiver 2a of the relay station 2 and is separated for each of the channels transmitted, thereby an information signal is provided for each channel. The information signal is stored in a rewritable recording medium (not shown) and then, retransmitted from a retransmitter 2b via a coaxial cable 4 to the terminal stations 5 according to a retransmission schedule which will be described later. A system controller 2c of the relay station 2 performs a series of control operations in the relay station.

The system controller 1c in the base station 1 is connected via a public line 7 of the ground to the system controller 2c of the relay station 2 to ensure bidirectional communication. When the base station 1 transmits a diagnosis code over the satellite line, this ground line may be used to transmit the histories of data error statuses from the relay stations to the base station or request for retransmission of error-containing information signal sent through the satellite line.

Figure 3:
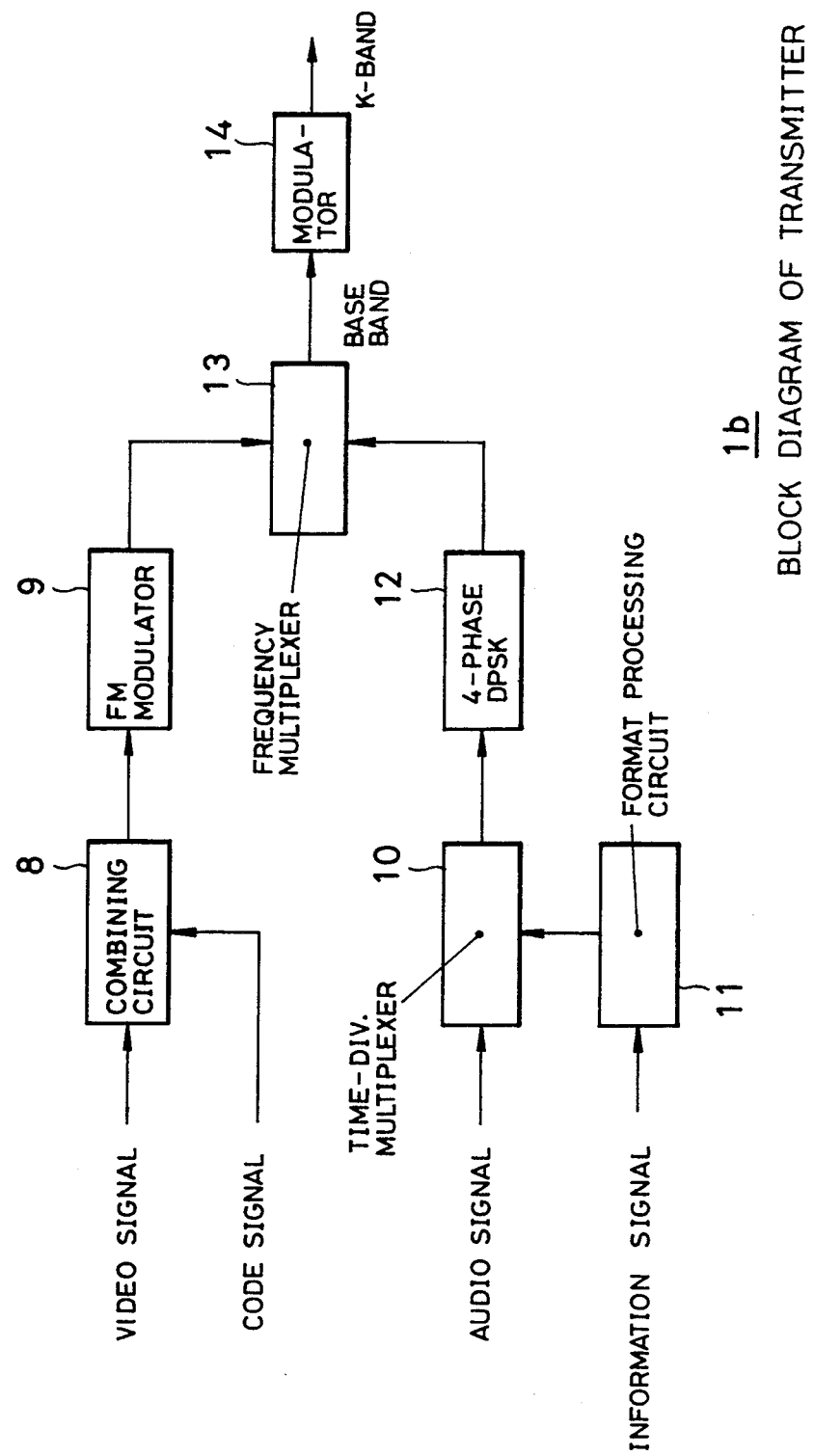
FIG. 3 is a block diagram of a satellite signal transmitter shown in FIG. 2.

A baseband signal transmitted in each channel signal will now be described below. As shown in FIG. 3, a combining circuit 8 inserts code signals, such as a time code and attribute code, into a video signal in the vertical blanking period. The resultant signal is then modulated by an FM modulator 9. The PCM audio signal (hereinafter, simply referred to as an audio signal) is supplied to a time-division multiplexer 10 where it is multiplexed with the information data divided into packets by a format processing circuit 11. The multiplexed signal is modulated by a 4-phase digital phase-shift keying circuit 12 to a digital subcarrier signal.

The video signal and audio signal, both after the modulation, are multiplexed in a frequency multiplexer 13 to form a baseband signal of a digital subcarrier sound adding system. Further, the base band signal is used in a modulator 14 to modulate an uplink carrier wave of Ka band (27.50 to 29.25 GHz). The uplink carrier wave is power amplified and transmitted to the satellite.

Figure 4:
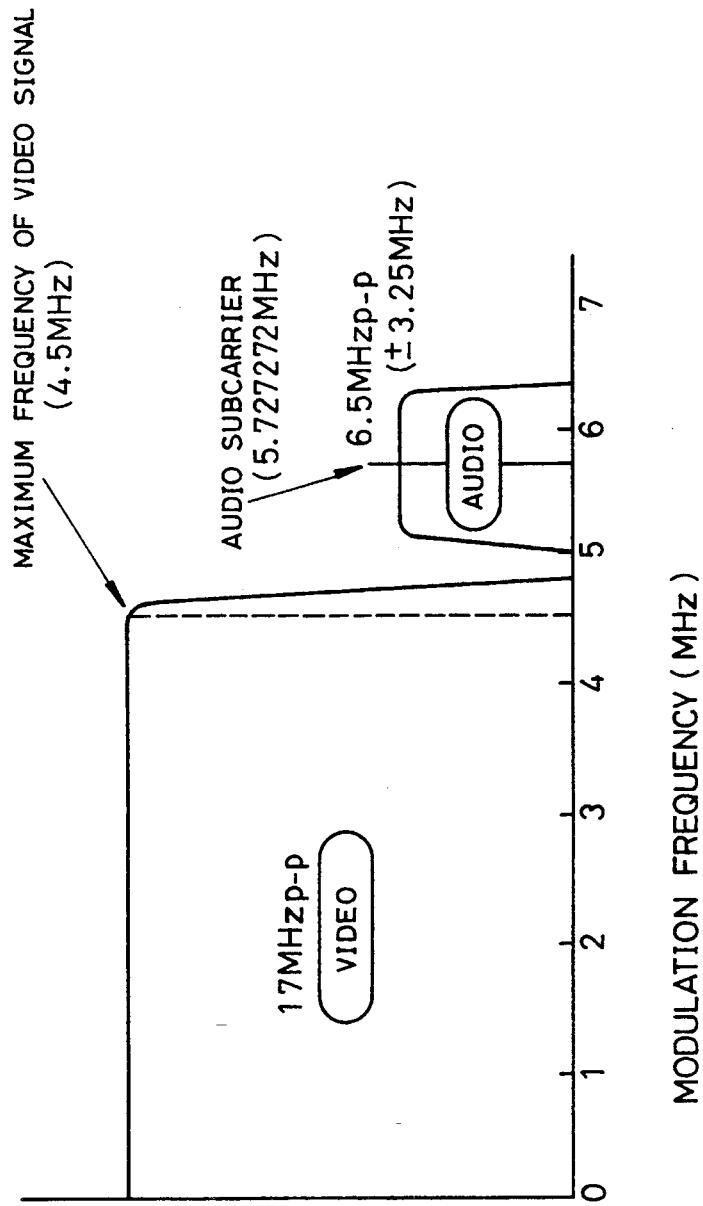
FIG. 4 is a diagram showing the format of a baseband signal shown in FIG. 3.

As shown in FIG. 4, the base band signal has such a format that the FM modulated carrier of the video signal has a maximum modulation frequency of 4.5 MHz. With regard to the audio and information data, a digital subcarrier system is employed to provide a 4-phase DPSK (Digital Phase-Shift Keying) using a subcarrier of 5.727272 MHz. The other specifications (items) are as shown in Table 1.

TABLE 1

AUDIO SIGNAL TRANMISSION IN DIGITAL SUBCARRIER METHOD (VIA SATELLITE)

| Items | Transmission Mode | |
|---|---|---|
| | Mode A | Mode B |
| Signal Multiplex System | | |
| Audio signal bandwidth | 15 kHz | 20 kHz |
| Sampling frequency | 32 kHz | 48 kHz |
| Code transmission speed | 2.048 Mb/s ± 10 bps | |
| Number of channels | 4 channels | 2 channels |
| Modulation System | | |
| Subcarrier frequency | 5.727272 MHz ± 16 Hz | |
| Frequency shift in main carrier by subcarrier | ±(3.25 MHz +10%, −5%) | |
| Subcarrier modulation system | 4-Phase DPSK | |

As described above, the information signal transmitted from the communications satellite 3 consists of three channels for the video signal, audio signal, and information data. The video signal channel contains three different types of image data. The first one is a nationwide network video data (V) which is retransmitted in real time through every relay stations 2 to all the CATV terminal stations 5. The second one is a still picture (S1), which may be prepared on the basis of the weather information coming from the meteorological satellite, and is selectively received by a predetermined relay station. The third is local video data (LV) which is also received at corresponding relay stations.

The audio signal channel likewise contains three different types of audio data, namely, two types of audio signals for the aforementioned nationwide network video (A), and for the local video (LA), and an audio signal for BGM (B1) for the time when still pictures are transmitted. In particular, the audio signals of the nationwide network video and local video are essential to the image so that those signals are transmitted together with the corresponding video signals. The information data channel contains, retransmission schedule data, video pickup information for each relay stations, bill messages, diagnostic codes, and other messages as well as information about the image and sound as described above.

Before the transmission of the information signal, a schedule table for the information signal to be sent is transmitted from the base station 1 to the relay stations 2. On the basis of the table, each of the relay stations 2 prepares itself for smooth reception of the main information signals. As illustrated in the timing chart for the transmission, reception, and retransmission in FIG. 5, the base station 1 transmits video pickup information (C). Each of the relay stations stores this video pickup information.

Figure 5:
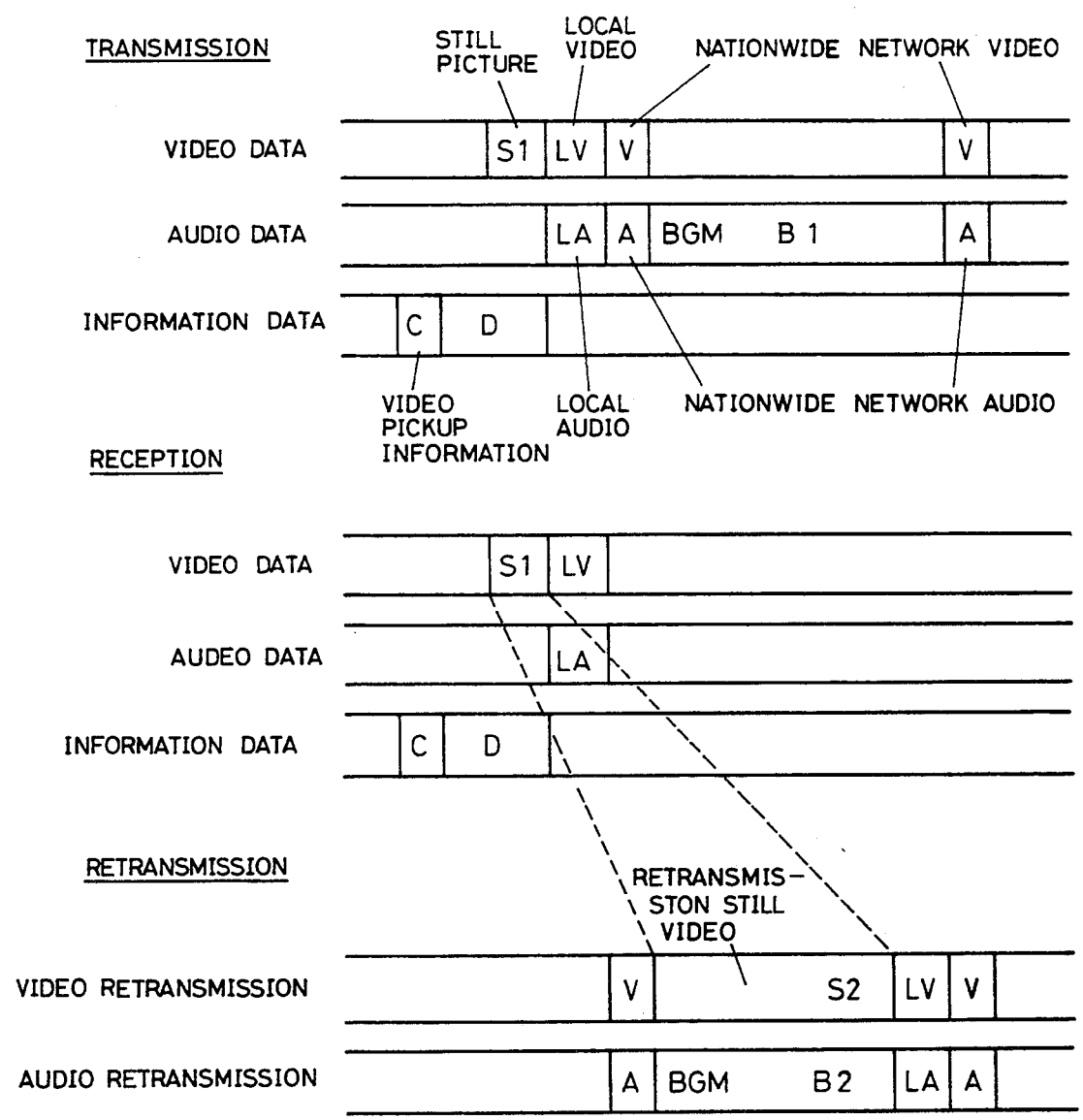
FIG. 5 is a timing chart for transmission and reception of information signal in the information transmission system of the present invention.

Then, the information data (D) such as the retransmission schedule data, audio code, and weather code is transmitted. Subsequently, the still pictures (S1) and local video data (LV) are transmitted on the video channel according to the retransmission schedule data. It is then determined whether or not the video signal should be taken in using the code data inserted in the vertical blanking periods of the video signal and the video pickup information previously stored. In the associated relay station 2, the video signal is recorded on a rewritable recording medium. In FIG. 5, the video (V) and audio (A) signals for the nationwide network are transmitted, and retransmitted unchanged in real time to the terminal stations 5.

Retransmission of the received signals from the relay station 2 to the terminal stations 5 is carried out in a sequence determined by the retransmission schedule while reading out the video signal from the rewritable recording medium. Normally, the still picture data S1 is compressed along the time axis, so that it is expanded along the time axis at the time of retransmission, and is retransmitted as a still picture S2. If necessary, the local video (LV) and audio (LA) would also be retransmitted. At the time the still picture (S2) is retransmitted, BGM (B2) is also sent to the audio channel to the terminal stations 5. About 70 types of BGMs are prepared in each relay station 2 and are arbitrarily selected for transmission.

Figure 6:
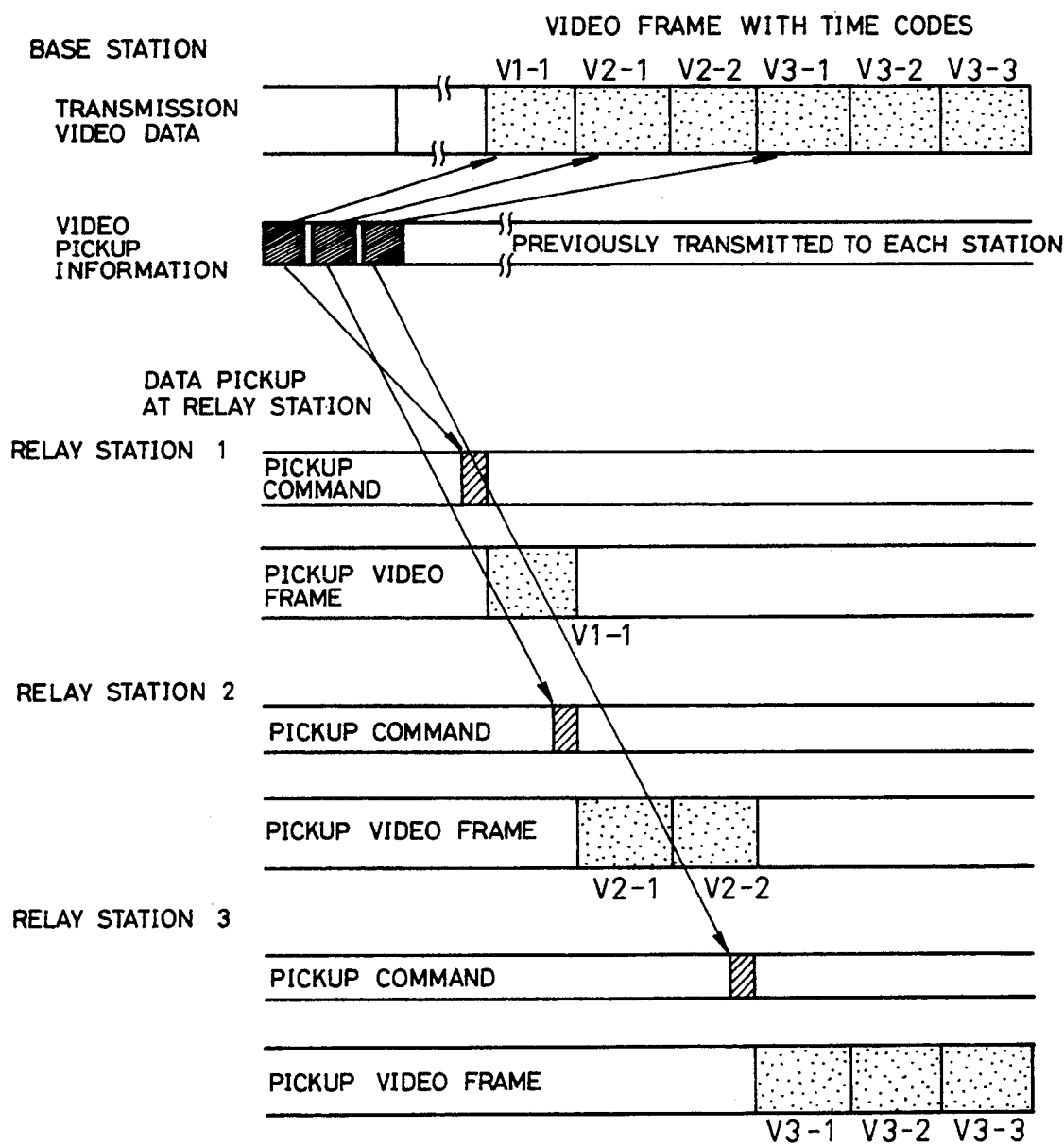
FIG. 6 is a timing chart showing a sequence for retrieving video frames shown in FIG. 5.

While the video signal from the base station 1 is transmitted frame by frame, whether the frame is to be taken in by the relay station is previously known based on the video pickup information which was sent beforehand. Suppose that there are three relay stations, as shown in FIG. 6. In this case, the video pickup information is included in the information data in advance and transmitted. As the frame V1-1 should be taken in a relay station [1], a pickup command is issued in the relay station [1] to store the frame 1-1 in the rewritable recording medium. As the frames V2-1 and V2-2 are to be taken in the relay station [2], a pickup command is issued in the relay station [2]. Likewise, with regard to the three frames V3-1, V3-2 and V3-3, a pickup command is issued for in the relay station [3].

The time code, inserted in the vertical blanking period of each frame of each video signal mentioned above, is an 8-digit BCD code representing "hour," "minute," "second" and the frame number of that frame. The attribute code is also an 8-digit BCD code, and consists of two digits of weather code, two digits of an audio code and four digits of reserve code.

Figure 7:
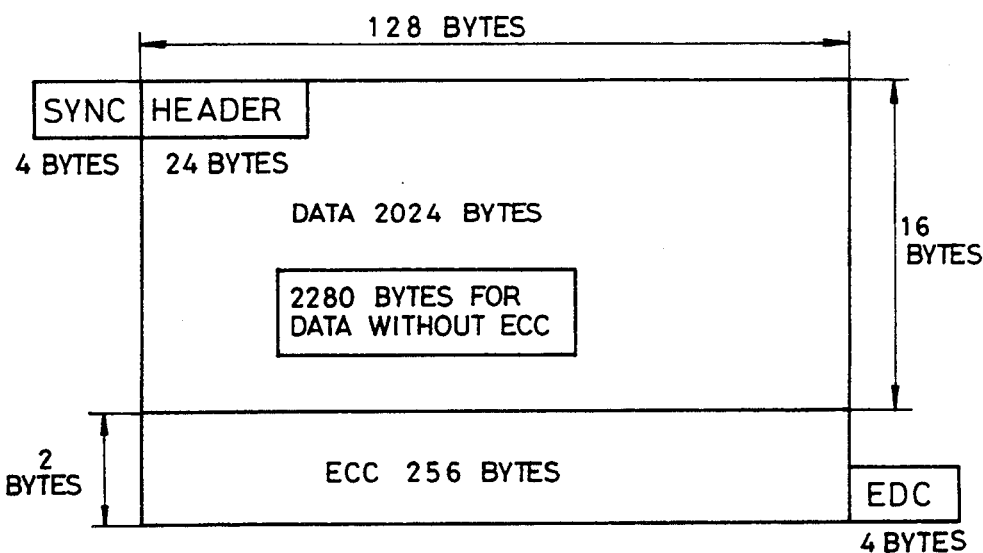
FIG. 7 is a diagram showing the format of a information signal associated with the information transmission system of the present invention.

The information data is divided into packets each of 2312 bytes, and is transmitted as being multiplexed, with the time axis, to the information data channel. As shown in FIG. 7, a 4-byte sync signal SYNC is affixed to the head of each packet to permit each relay station to identify the packet and catch it when necessary. This sync signal SYNC has a double-sync structure which has identical two 2-byte sync signals different from those of the other packets and arranged continuously, so that detecting one of them is sufficient to surely identify and catch the packet. Following the SYNC, there are 2024-byte data containing a HEADER portion, a 256-byte error correct code ECC, and a 4-byte error detect code EDC added at the end. The ECC operation for error correction involves a Reed-Solomon code, for example, to ensure error correction of one byte in 16-byte of data. In other words, the ECC operation on a group of data permits the detection of the presence/absence of an error for a column (vertical direction in FIG. 7) of data and correction of the error if any. The EDC operation on a group of data allows for the detection of the presence/absence of an error over the entire rows and columns (horizontal direction in the figure) of data and also the detection of error correction by ECC (ECC correction). The error detection by the EDC shows high accuracy, and ensures finer detection than the ECC-oriented error detection. Three types of information about a data error, namely, the ECC-involving detection of the presence/absence of an error, the EDC-involving detection of presence/absence of an error and the occurrence/non-occurrence of ECC correction, are used as error detection data to be described later. In the case where no ECC operation is performed and only the EDC-involving error correction is carried out, the information data area has a size of 2024 bytes for data plus 256 bytes for the ECC, amounting to 2280 bytes.

Figure 8:
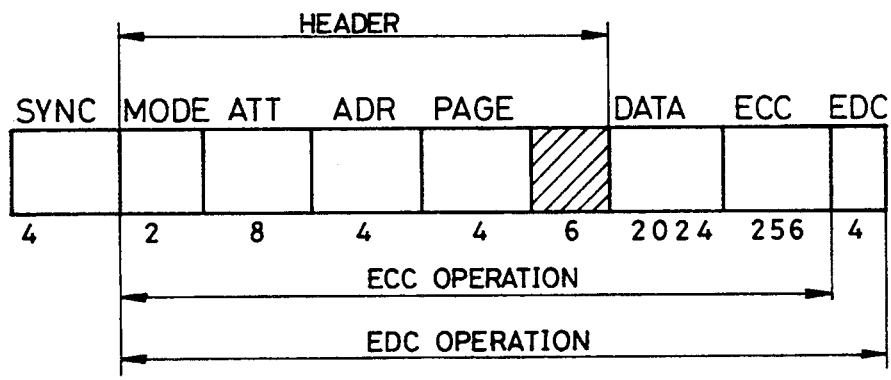
FIG. 8 is diagram showing the format of a header of the data signal shown in FIG. 7.
Figure 9:
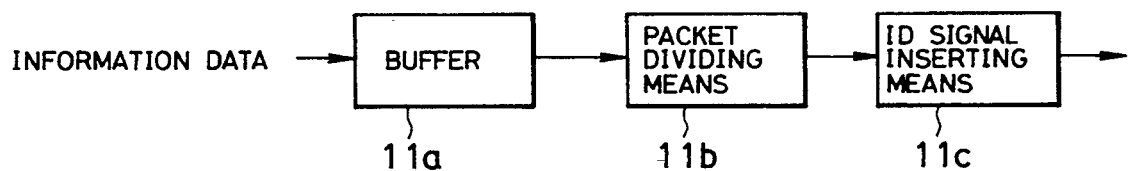
FIG. 9 is a block diagram of a format processing circuit shown in FIG. 3.

At the head of the data area is located a 24-byte header (HEADER), which is divided into five blocks of MODE, ATT, ADR, PAGE and a reserve area, as shown in FIG. 8. MODE is an ID code to determine whether error correction should be made. ATT consists of eight bytes, and its first and second bytes represent the attributes of information data. In the case of weather data, those two bytes become codes to identify the type of a meteorological satellite 6 (AMeDas, Himawari, Meteor, etc.) and to indicate the seasons, typhoon, thunder, etc. In the case of the audio code, the two bytes become an ID code to identify the types of an audio signal, such as stereo, bilingual, monaural, and multiplex audio. Those two bytes of ATT include ID codes for retransmission schedule data, reception enable, a bill message, error diagnosis, other messages and data for a local image. The third to eighth bytes of ATT are supplied with data (month, day and time) specifying the transmission time. ADR is a relay station designation code representing the area classification for each relay station and the address thereof. Each relay station 2 determined whether the information signal is addressed to itself referring to the contents of ADR. ADR consists of four bytes, the second byte classifying the site of the relay station and the fourth byte indicating the address of the relay station. When the second and fourth bytes are both "0," it means simultaneous broadcasting to the entire relay stations. The first and third bytes are reserved for the future use.

The information data does not always fit in a signal packet having a capacity of 2280 bytes. The information data is often packed in multiple packets by the same attribute, i.e., by the same type. Further, the same type of packets are not always sent one after another, but various types of packets are sometimes sent at random. The base station 1 therefore inserts a packet ID signal in each packet. In the packet format processor 11 in FIG. 9, the information data written in a buffer memory 11a is read out in the units of 2024 bytes or 2280 bytes, and supplied to packet dividing means 11b which divides the data into packets. In ID signal inserting means 11c, the packet ID signal is inserted in PAGE in the header by four bytes, for example, as (packet number/total number of packets), and is supplied to the time-division multiplexer 10. This packet ID signal consists of the total number of packets of the same type and the individual packet numbers within a group of the same type of packets. Upon reception of the information data, the relay station arranges multiple packets in the order of the packet numbers, based on the total number of packets and the packet numbers included in PAGE. When the relay station has received all packets of the same type, the relay station can decode data from those packets as one package. The packets may not be transmitted to the relay station in the order of their packet numbers, but may be transmitted at random. Since the relay station is informed of the total number of the packets in this case, the relay station re-arranges the received packets according to the packet numbers, groups the packets by the type, and processes the data or decodes the information. This can provide a sort of a scramble effect.

As described above, the ID code included in the header is very important; however, with the ECC operation shown in FIG. 8, data error cannot be corrected until 2280 bytes of data are all received. If the ID code included in ADR of the header indicates the received data being irrelevant to the relay station itself immediately after reception of the header, the relay station can terminate the reception of the remaining 2280 bytes of data. In this respect, a 2-byte redundant code is provided in the reserved block in the header for correction of an error in its own header, and the contents of the header are decoded immediately after the reception of the header.

Figure 10:
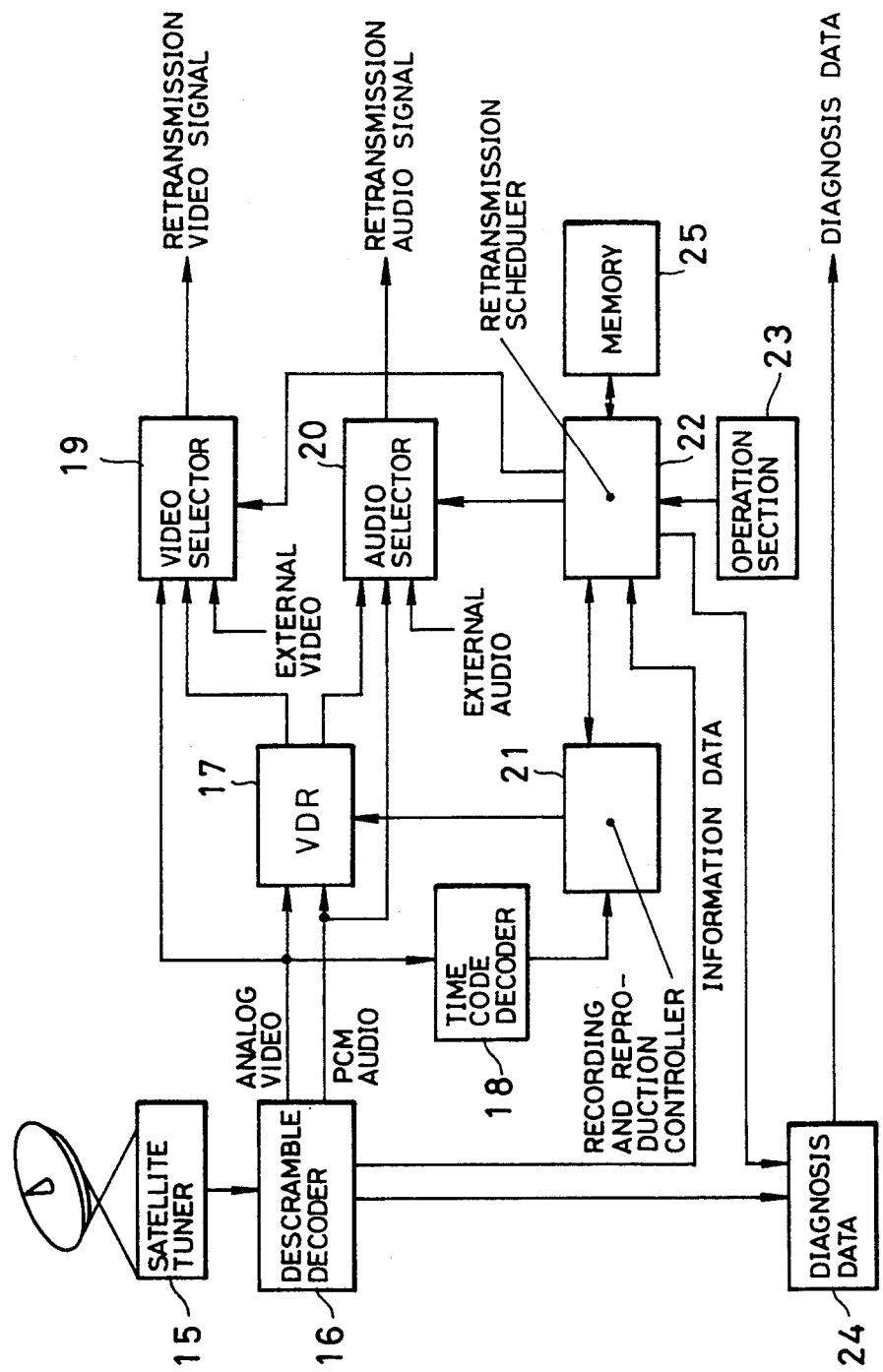
FIG. 10 is a block diagram showing a relay station according to the present invention.

How the information signal flows in each channel of the relay station will now be described. In FIG. 10, the modulation wave from the communications satellite 3 is received at a satellite tuner 15 serving as receiving means, and then is supplied to a descramble decoder 16. Since the base station 1 has scrambled the information signal to prevent the wiretapping by unauthorized parties or non-subscribers, the descramble decoder 16 descrambles the received data to obtain the information signal. Then, the information signal is separated into the video signal, audio signal, and information data and demodulated respectively.

The FM-demodulated video signal is supplied to a VDR (video disk recorder) 17, a time code decoder 18 and a video selector 19. The VDR 17 serves as recording medium play means which performs data recording on and data reproduction from an optical disk (not shown) as a rewritable recording medium. The audio signal after digital phase modulation is sent to the VDR 17 and an audio selector 20. The time code decoder 18 extracts a time code and an attribute code which have been inserted into the vertical blanking period of the video signal, decodes the codes and supplies them to a recording and reproduction controller 21. The recording and reproduction controller 21 supplies a record command to the VDR 17 in accordance with the time and attribute codes. The frame of a video signal and an audio signal to be retransmitted to each terminal stations 5 are recorded by the VDR 17. Error detection and correction are made on the information data, which has been received and demodulated prior to the video and audio signals, and this information data is stored in a memory 25 by a retransmission scheduler 22.

Figure 11:
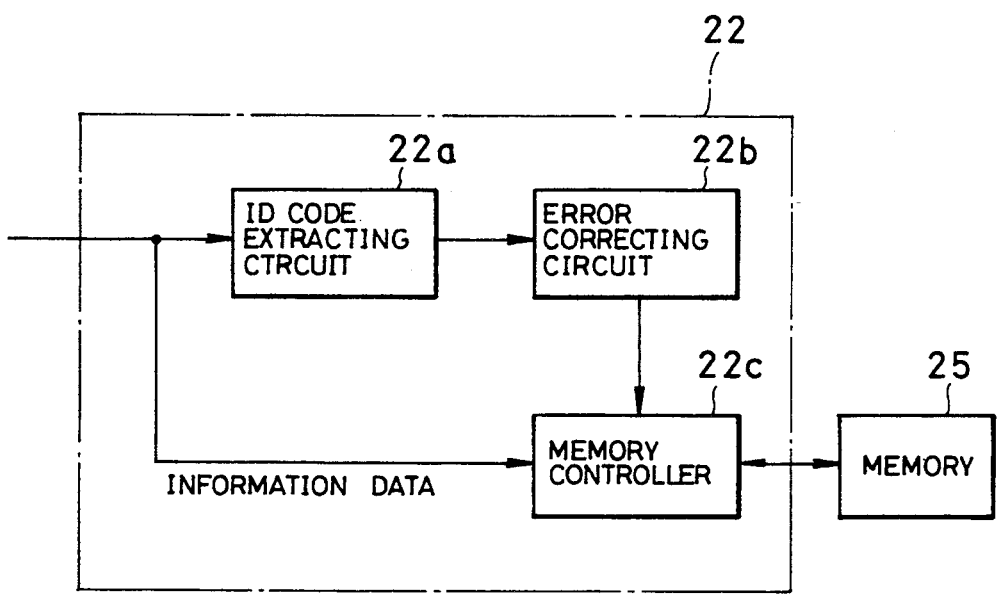
FIG. 11 is a block diagram of a retransmission scheduler 22 shown in FIG. 10.

In FIG. 11, the information data supplied packet by packet to the retransmission scheduler 22 is sent to an ID code extracting circuit 22a so that the circuit 22a extracts the ID code of the header in each packet. An error correcting circuit 22b, located in the succeeding stage of the circuit 22a, performs error correction on the ID code, and supplies the resultant code to a memory controller 22c. If the memory controller 22c judges the ID code as being information data to be acquired at the station itself, a packet of data following the header is written into the memory 25, based on the packet ID signal.

Figure 12:
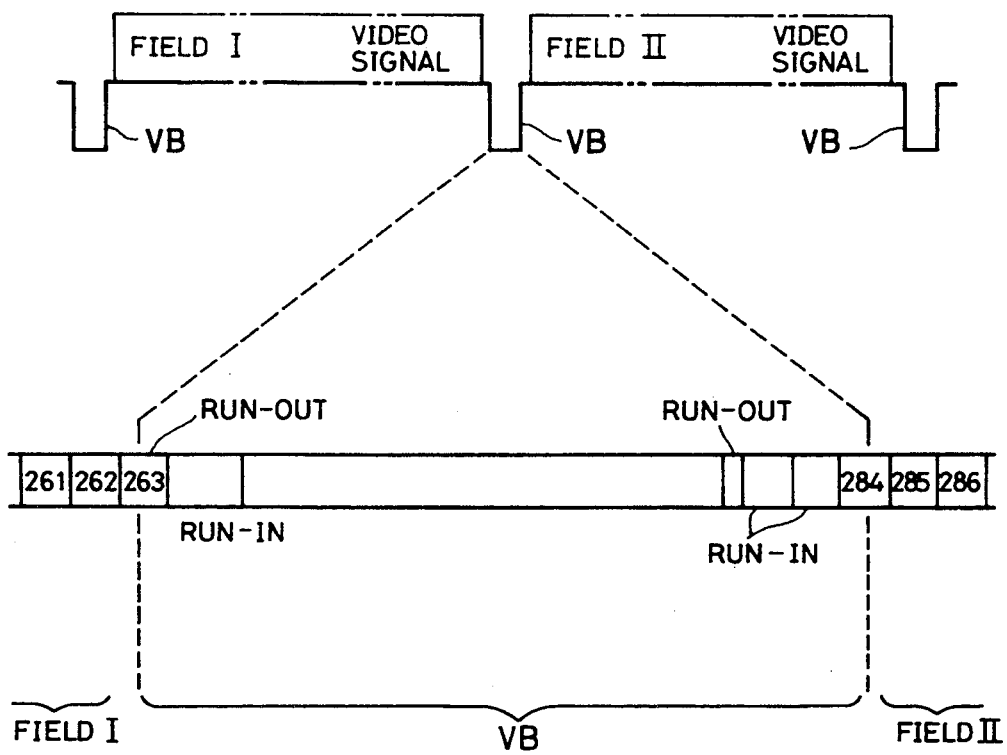
FIG. 12 is a diagram showing the format of a recorded signal shown in the block diagram of FIG. 10.

Since the rewritable recording medium and an apparatus to play the medium are disclosed in Japanese Patent Application No. H2-300672 by the present applicant, their detailed description will not be given in this specification. According to that invention, a video signal of a predetermined format, such as NTSC and PAL, is converted into a digital signal, then is compressed along the time axis. The resultant signal is converted again into an analog signal and is FM-modulated to be recorded on an optical disk. Further, a PCM audio signal is inserted into the vertical blanking period VB of the video signal for multiplex recording as shown in FIG. 12.

In general, when the video signal is recorded on a recording medium, not limited to an optical disk as used in this embodiment, and the disk is played to reproduce the original video signal, a so-called dropout occurs due to defects of the recording medium, such as scratches or stain. Normally, the line correlation between video signals is used to compensate for the dropout. Since the video signal carrying a dropout is not entirely the same as the video signal to compensate for the dropout, however, perfect compensation is difficult. With the use of an optical disk which has addresses for a record area in advance as in this embodiment, the addresses are searched for the address of the area which has scratches, stain or the like. The recording/reproduction controller 21 in FIG. 10 performs address management for the optical disk where data is to be recorded, in such a way that the video and audio signal are recorded on the disk, avoiding any scratched or stained area. According to this address management, after a retrieval mode is set first before the information signal is recorded and a predetermined reference signal, such as sine wave or a digital pulse with the duty ratio of 50%, is recorded on the entire record area on the optical disk, and when the disk is played and the retrieved read signal has dropout, the address of the location of the dropout is stored. Then, the information signal is recorded in the normal areas on the disk, excluding the dropout area while checking the address of the record area in record mode. The use of such a recording method can prevent the occurrence of a dropout.

Figure 13:
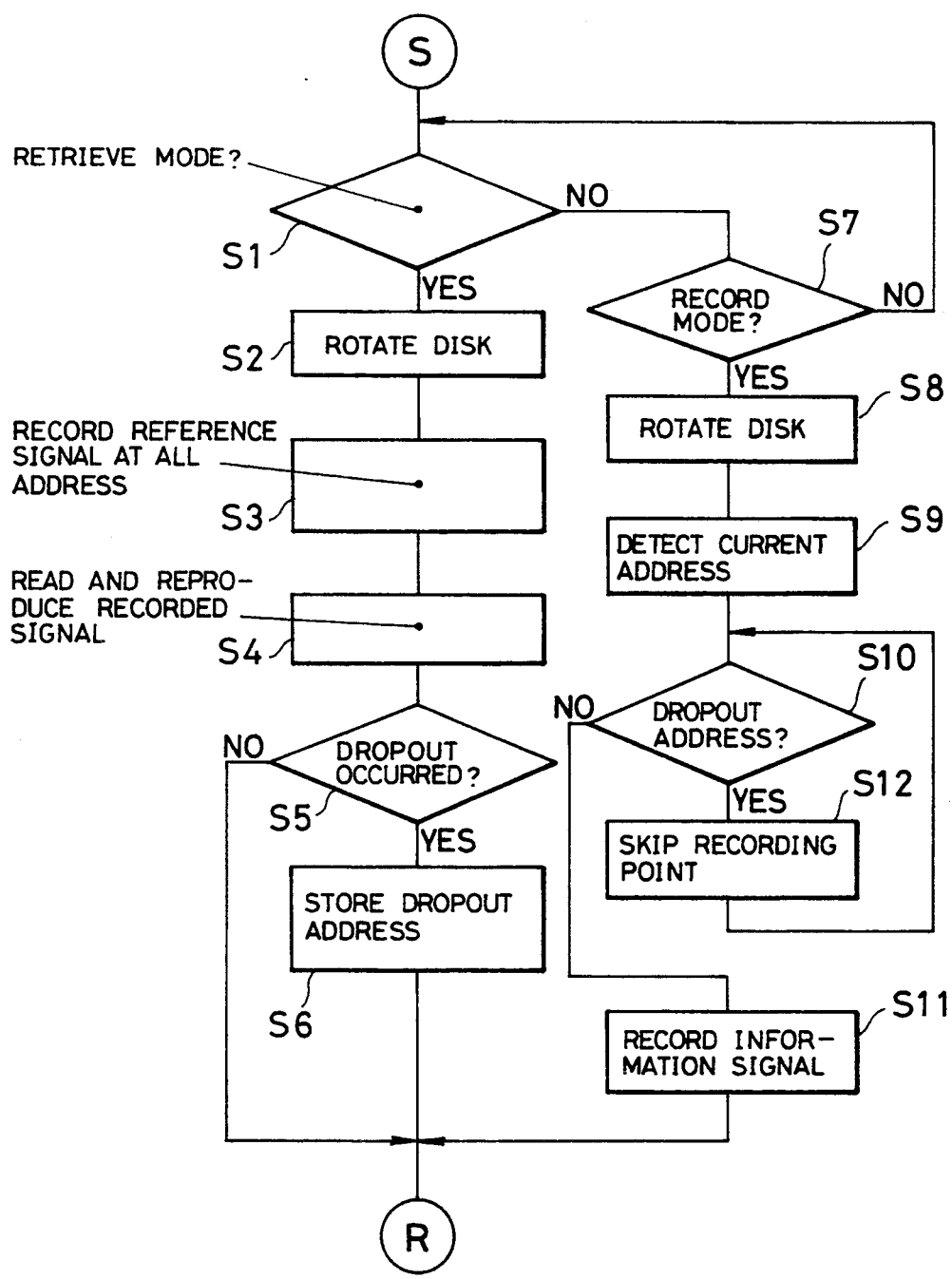
FIG. 13 is a flow chart showing the operation of a record/playback controller 21 shown in FIG. 10.

FIG. 13 shows a flowchart of a subroutine which the recording and reproduction controller 21 performs. When a mode is selected in the main routine (not shown), it is determined if the selected mode is a retrieval mode (step S1). If it is Judged as the retrieval mode, a disk is rotated (step S2), and a reference signal is recorded at every address in the record area of the disk (step S3). The disk, after recording, is played to read and reproduce the record signal (step S4). It is then determined whether a dropout appears in the reproduced signal (step S5). When the dropout has occurred, the associated address is stored as a dropout address (step S6), and the flow returns to the main routine. If no dropout is detected in step S5, the flow returns to the main routine without performing further processes.

If the selected mode is judged as a record mode at the time of actually recording the information signal (step S7), the disk is rotated (step S8), and the information signal is recorded on the disk. The address of the recording point is detected as the information signal is recorded (step S9). It is then determined whether or not the address is the dropout address (step S10). When the address is not judged as the dropout address, the information signal is recorded at the recording point associated with the address (step S11). If the address is judged as the dropout address, the recording point of that address is skipped (step S12), and the information signal will not be recorded unless the address of a new recording point differs from the dropout address. The flow then returns to the main routine.

In the case where an optical disk having video and audio signals recorded thereon is played to reproduce signals, a signal processing of the direction reverse to the signal-recording process needs to be performed as a matter of course, and then reproduced video and audio signals can be obtained. A video signal (V) and an audio signal (A) for a nationwide network are retransmitted through the relay station 2 to the terminal stations 5 in real time as mentioned above, and will not be recorded in the VDR 17.

Based on a retransmission schedule stored in the retransmission scheduler 22, still pictures, BGM, and local video and local audio signals are retransmitted from the relay station 2 to the terminal stations 5. The retransmission scheduler 22 supplies a retransmission command to the recording and reproduction controller 21, which in turn sends a reproduction-playing command to the VDR 17. In accordance with the reproduction-playing command, the video and audio signals are reproduced while executing signal processing, such as expanding of the still picture along the time axis. The reproduced signals are then supplied to the video and audio selectors 19 and 20, respectively. According to a select command from the retransmission scheduler 22, the video selector 19 sends a nationwide-network video signal, still pictures, a local video signal, or an external video signal produced by the relay station, through a transmitting section (not shown) to the terminal stations 5. At the same time, the audio selector 20 sends a nationwide-network audio signal, BGM for still pictures, a local audio signal, or the audio signal of the external speech signal to the terminal stations 5. The external video and speech signals are edited for transmission through an operation section 23 to the terminal stations 5 to be put together with the retransmission schedule from the base station 1.

Figure 14:
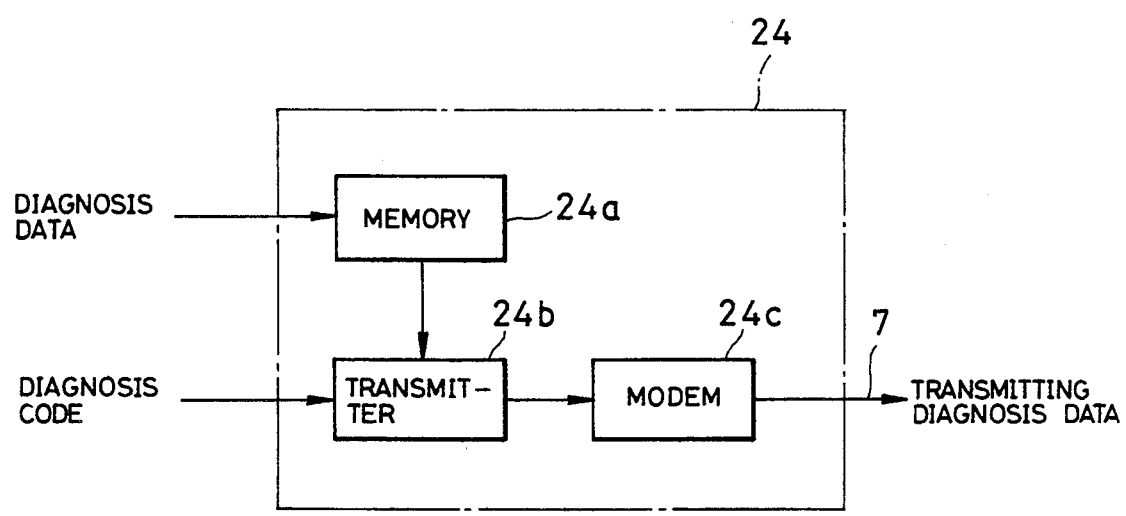
FIG. 14 is a block diagram of a diagnostic data memory 24 shown in FIG. 10.

Error detection data from the descramble decoder 15 is supplied to a diagnosis-data memory 24. In FIG. 14, the diagnosis data is stored and accumulated in a memory 24a. In accordance with a diagnosis code as a command to return error diagnosing information from the base station 1, the diagnosis data is then transmitted from a transmitter 24b, via a line connecting means 24c, such as a modem, over the public telephone line 7 to the base station 1. The diagnosis code is included in ATT which is attribute data of information data in the header format shown in FIG. 8. Upon reception of the diagnosis data or requests from the relay stations 2, the base station 1 retransmits correct data. Further, based on the diagnosis data, the base station 1 controls the entire satellite communications system, such as increase in the output from the base station 1, or repetitive transmission of the same data.

Figure 15:
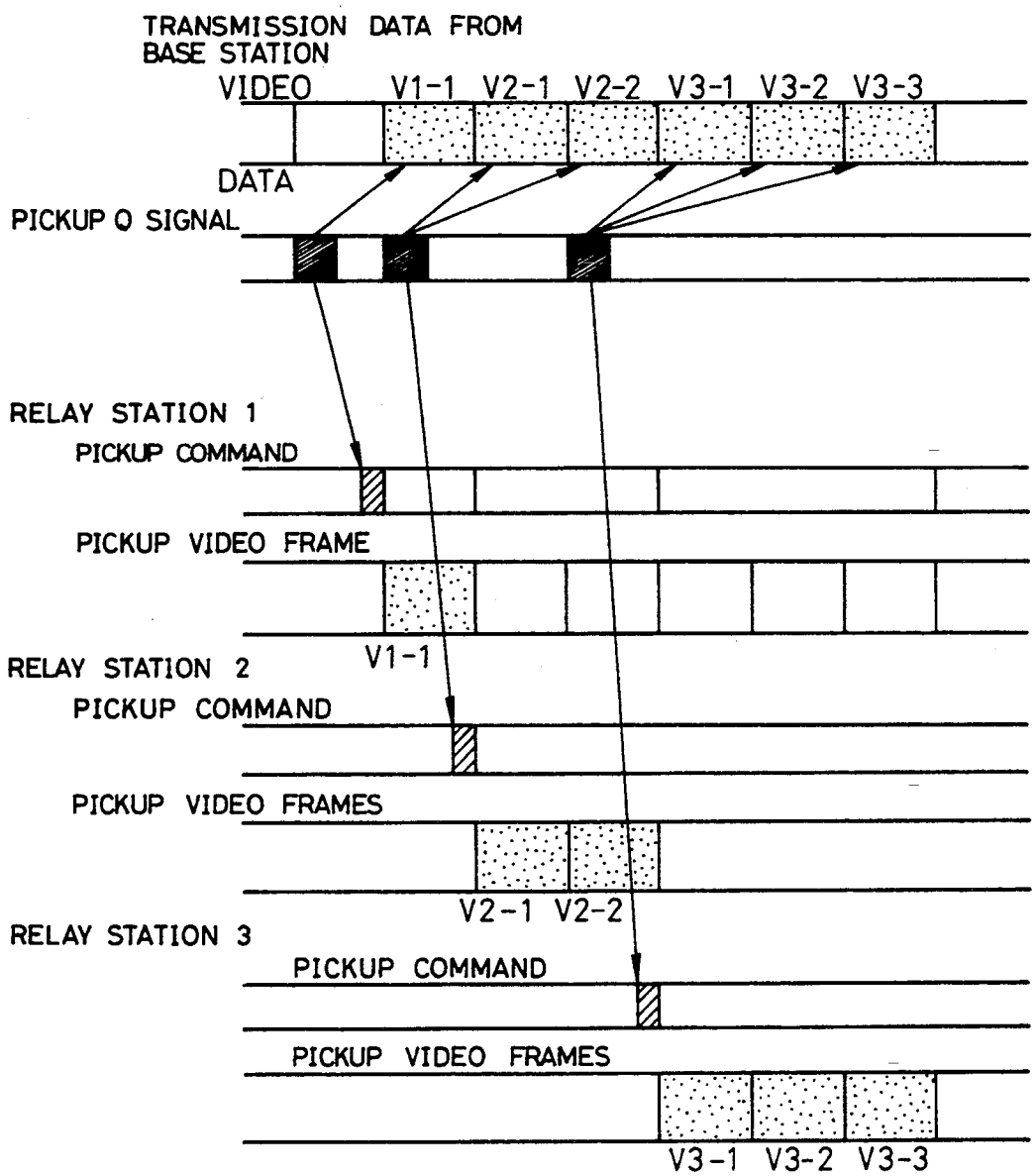
FIG. 15 is a timing chart showing a sequence for retrieving video frame signals according to another embodiment of the present invention.

According to this embodiment, the video reception information is previously sent to the respective relay station as shown in FIG. 6. Another embodiment where the video pickup information is sent upon each transmission of a video signal will now be described referring to FIGS. 15 and 16. In FIG. 15, a data pickup signal Q is transmitted one frame before a video frame V1-1 for a relay station 1. In response to the signal Q, the relay station 1 outputs a pickup command to receive the frame V1-1. A relay station 2 receives the signal Q one frame before a video frame V2-1, so that two frames (V2-1, 2-2) are picked up. Likewise, a relay station 3 will pickup three frames (V3-1, 3-2 and 3-3).

Figure 16:
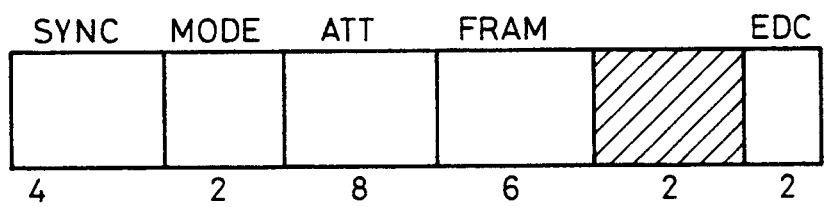
FIG. 16 is a diagram showing the format of a data retrieve Q signal shown in FIG. 12.

The data fetch signal Q has a format consisting of 24 bytes as shown in FIG. 16. SYNC, the first four bytes, has two consecutive 2-byte sync signals as in the data format shown in FIGS. 7 and 8. Even if the first SYNC signal is missed, synchronization can still be attained by catching the next SYNC signal, as in the first embodiment. Particularly in this embodiment, since the video frames immediately follow the signal Q, detection of the signal Q should not be missed, and it is important to catch the SYNC signal. MODE, consisting of two bytes, specifies the data pickup signal Q, and also indicates whether the error correct code (ECC) is added or not. ATT indicates the attribute of information data, while EDC is an error detection code. The signal Q is transmitted at least three times in a row before the start of the frame to be acquired. During this transmission, the relay station 2 is controlled to complete preparation of the VDR 17 for recording. The use of a so-called fail safe system in this embodiment, therefore, ensures data acquisition with high reliability. 6-byte FRAM indicates the number of video frames to be sequentially received. The number of frames of still pictures to be acquired is expressed by minutes, seconds and frame numbers, and only the designated number of frames are written in the VDR 17.

As described above, the information transmission system of the present invention features the procedure of adding a retransmission schedule data to a information signal to be transmitted from the base station, separating the retransmission schedule data from the information signal and storing it at a corresponding relay station, recording the information signal into a rewritable recording medium of the relay station, and retrieving the information signal from the recording medium in accordance with the retransmission schedule for retransmission to terminal stations. With this procedure, each relay station can retransmit the information signals supplied from the base station according to the precise retransmission schedule to terminal stations while automatically rearranging the information signals in a given order.

What is claimed is:

1. An information transmission system comprising:
a base station for supplying an information signal carrying video information;
at least a relay station for receiving and retransmitting said information signal to a plurality of terminal stations; said base station having means for producing said information signal, means for producing schedule data for retransmission, means for combining said information signal and said schedule data for retransmission into a composite signal, and a transmitter for transmitting said composite signal, and said relay station having a receiver for receiving the composite signal, extracting means for extracting said schedule data for retransmission from said composite signal, a memory for storing said schedule data for retransmission, recording medium playing means for recording said information signal contained in said composite signal into a rewritable recording medium and retrieving said information signal from said recording medium according to said schedule data for retransmission for outputting a reproduced information signal, and retransmitting means for retransmitting said reproduced information signal to said terminal stations, wherein video pickup information for designating at least one video frame, transmitted in a compressed form, to be picked up at each relay station is transmitted from said base station and stored in said memory at each relay station, and said receiver of each relay station is operated to pickup said at least one video frame transmitted from the base station for a time period defined by said video pickup information retrieved from said memory and store a picked-up video frame in said rewritable recording medium, and subsequently said at least one video frame which has been stored in said rewritable recording medium is retrieved and retransmitted as expanded reproduced information signal in accordance with the retransmission schedule data stored in said memory.

2. The information transmission system of claim 1, wherein said information signal is a compression signal of weather data.

3. The information transmission system of claim 1, wherein said composite signal includes at least an address of said relay station and schedule data for retransmission for said relay station.

4. The information transmission system of claim 1, wherein said receiver receives said composite signal transmitted via a satellite.

5. The information transmission system of claim 1, wherein said composite signal includes, as said information signal, schedule data for retransmission of video and audio data, and said video data includes still picture data.

6. An information transmission system as claimed in claim 1, wherein said rewritable recording medium comprises a disk shaped recording medium.

7. An information transmission system as claimed in claim 1, wherein said relay station further comprises control means for first storing said schedule data in said memory, subsequently storing said information signal in said rewritable recording medium, and then expanding said information signal and retransmitting said expanded reproduced information signal in a retransmission time period designated for the relay station in accordance with said schedule data.

8. A relay station apparatus for receiving an information signal carrying video information from a base station and retransmitting them to a plurality of terminal stations, comprising:
  extracting means for extracting schedule data for retransmission added to said information signal supplied from said base station;
  a memory for storing said schedule data for retransmission;
  recording medium playing means for recording said information signal into a rewritable recording medium and retrieving said information signal from said recording medium according to said schedule data for retransmission for outputting a reproduced information signal, retransmitting means for retransmitting said reproduced information signal to said terminal stations,
wherein video pickup information for designating at least one video frame, transmitted in a compressed form, to be picked up at each relay station is transmitted from said base station and stored in said memory at said relay station, and said relay station is operated to pickup said at least one video frame transmitted from the base station for a time period defined by said video pickup information retrieved from said memory and store a picked-up video frame in said rewritable recording medium, and subsequently said at least one video frame which has been stored in said rewritable recording medium is retrieved and retransmitted as expanded reproduced information signal in accordance with the retransmission schedule data stored in said memory.

9. A relay station apparatus as claimed in claim 8, wherein said rewritable recording medium comprises a disk shaped recording medium.

10. The information transmission system of claim 8, wherein said information signal is a compression signal of weather data.

11. The information transmission system of claim 8, wherein said composite signal includes at least an address of said relay station and schedule data for retransmission for said relay station.

12. The information transmission system of claim 8, wherein said receiver receives said composite signal transmitted via a satellite.

13. The information transmission system of claim 8, wherein said composite signal includes, as said information signal, schedule data for retransmission of video and audio data, and said video data includes still picture data.

14. An information transmission system as claimed in claim 8, wherein said relay station further comprises control means for first storing said schedule data in said memory, subsequently storing said information signal in said rewritable recording medium, and then expanding said information signal and retransmitting said expanded reproduced information signal in a retransmission time period designated for the relay station in accordance with said schedule data.

15. An information transmission system comprising:
  a base station for supplying an information signal carrying video information;
  at least a relay station for receiving and retransmitting said information signal to a plurality of terminal stations; said base station having means for producing said information signal, means for producing schedule data for retransmission, means for combining said information signal and said schedule data for retransmission into a composite signal, and a transmitter for transmitting said composite signal, and said relay station having a receiver for receiving the composite signal, extracting means for extracting said schedule data for retransmission from said composite signal, a memory for storing said schedule data for retransmission, recording medium playing means for recording said information signal contained in said composite signal into a rewritable recording medium and retrieving said information signal from said recording medium according to said schedule data for retransmission for outputting a reproduced information signal, and retransmitting means for retransmitting said reproduced information signal to said terminal stations, wherein video pickup information for designating at least one video frame, transmitted in a compressed form, to be picked up at each relay station is transmitted from said base station a predetermined time period prior to transmitting said at least one video frame, and received at each relay station, and said receiver of each relay station is operated to pickup said at least one video frame transmitted from the base station from said predetermined time period after receiving said video pickup information, for a time period defined by said video pickup information and store a picked-up video frame in said rewritable recording medium, and subsequently said at least one video frame which has been stored in said rewritable recording medium is retrieved and retransmitted as expanded reproduced information signal in accordance with the retransmission schedule data stored in said memory.

16. An information transmission system as claimed in claim 15, wherein said rewritable recording medium comprises a disk shaped recording medium.

17. An information transmission system as claimed in claim 15, wherein said relay station further comprises control means for first storing said schedule data in said memory, subsequently storing said information signal in said rewritable recording medium, and then expanding said information signal and retransmitting said expanded reproduced information signal in a retransmission time period designated for the relay station in accordance with said schedule data.

18. A relay station apparatus for receiving an information signal carrying video information from a base station and retransmitting them to a plurality of terminal stations, comprising:

extracting means for extracting schedule data for retransmission added to said information signal supplied from said base station;

a memory for storing said schedule data for retransmission;

recording medium playing means for recording said information signal into a rewritable recording medium and retrieving said information signal from said recording medium according to said schedule data for retransmission for outputting a reproduced information signal, retransmitting means for retransmitting said reproduced information signal to said terminal stations, wherein video pickup information for designating at least one video frame, transmitted in a compressed form, to be picked up at each relay station is transmitted from said base station a predetermined time period prior to transmitting said at least one video frame, and received at said relay station, and said relay station is operated to pickup said at least one video frame transmitted from the base station from said predetermined time period after receiving said video pickup information, for a time period defined by said video pickup information and store a picked-up video frame in said rewritable recording medium, and subsequently said at least one video frame which has been stored in said rewritable recording medium is retrieved and retransmitted as expanded reproduced information signal in accordance with the retransmission schedule data stored in said memory.

19. A relay station apparatus as claimed in claim 18, wherein said rewritable recording medium comprises a disk shaped recording medium.

20. An information transmission system as claimed in claim 18, wherein said relay station further comprises control means for first storing said schedule data in said memory, subsequently storing said information signal in said rewritable recording medium, and then expanding said information signal and retransmitting said expanded reproduced information signal in a retransmission time period designated for the relay station in accordance with said schedule data.

* * * * *